(12) United States Patent
Walters et al.

(10) Patent No.: US 11,025,592 B2
(45) Date of Patent: Jun. 1, 2021

(54) SYSTEM, METHOD AND COMPUTER-ACCESSIBLE MEDIUM FOR TWO-FACTOR AUTHENTICATION DURING VIRTUAL PRIVATE NETWORK SESSIONS

(71) Applicant: Capital One Services, LLC, McLean, VA (US)

(72) Inventors: Austin Walters, Savoy, IL (US); Vincent Pham, Champaign, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/593,504

(22) Filed: Oct. 4, 2019

(65) Prior Publication Data
US 2021/0105254 A1 Apr. 8, 2021

(51) Int. Cl.
*H04L 29/06* (2006.01)
*H04W 76/12* (2018.01)
(Continued)

(52) U.S. Cl.
CPC .......... *H04L 63/0272* (2013.01); *H04L 63/08* (2013.01); *H04L 63/10* (2013.01);
(Continued)

(58) Field of Classification Search
CPC ............ H04L 41/0213; H04L 41/0663; H04L 63/0272; H04L 63/0281; H04L 63/08; H04L 63/105; H04L 69/40; H04L 63/102; H04L 67/1021; H04L 67/125; H04L 67/16; H04L 63/0815; H04L 12/06; H04L 12/4633; H04L 12/4641; H04L 63/0428; H04L 63/0876; H04L 63/0884; H04L 69/03; H04L 61/1511; H04L 63/0236; H04L 63/029; H04L 63/0478; H04L 67/20; H04L 67/2814; H04W 52/0229; H04W 88/04; H04W 12/001; H04W 12/00403;
(Continued)

(56) References Cited

U.S. PATENT DOCUMENTS

6,507,908 B1 1/2003 Caronni
7,769,995 B2 8/2010 Corbett et al.
(Continued)

*Primary Examiner* — Abiy Getachew
(74) *Attorney, Agent, or Firm* — Hunton Andrews Kurth LLP (57) ABSTRACT

An exemplary system, method, and computer-accessible medium for authenticating a second device, can include initiating a first network connection between a server and a first device, initiating a second network connection between the server and the second device, and authenticating the second device based on the first network connection and the second network connection. Access to a network resource(s) can be granted to the second device based on the authentication. Access to the network resource(s) by the second device can be revoked if the first network connection is severed. The first network connection can be a first encrypted network connection and the second network connection can be a second encrypted network connection. The first network connection can be a first virtual private network ("VPN") connection and the second network connection can be a second VPN connection.

20 Claims, 6 Drawing Sheets

(51) Int. Cl.
*H04W 12/06* (2021.01)
*H04W 12/086* (2021.01)

(52) U.S. Cl.
CPC ......... *H04W 12/06* (2013.01); *H04W 12/086* (2021.01); *H04W 76/12* (2018.02); *H04L 2463/082* (2013.01)

(58) Field of Classification Search
CPC . H04W 12/02; H04W 12/06; H04W 12/0609; H04W 48/16; H04W 4/80; H04W 76/10; H04W 76/12; H04W 76/14; H04W 84/18; H04W 88/06; Y02D 70/142; Y02D 70/144; G06F 21/34
See application file for complete search history.

(56) References Cited

U.S. PATENT DOCUMENTS

| | | | |
|---|---|---|---|
| 8,296,825 B2 | 10/2012 | Leone et al. | |
| 8,769,661 B2 * | 7/2014 | Wang | H04L 12/4641 726/12 |
| 8,868,913 B1 | 10/2014 | Watsen | |
| 8,875,277 B2 | 10/2014 | Sharkey | |
| 8,949,949 B1 | 2/2015 | Sella et al. | |
| 9,178,697 B2 | 11/2015 | Gladstone et al. | |
| 2002/0144144 A1 | 10/2002 | Weiss et al. | |
| 2003/0191843 A1 | 10/2003 | Balissat et al. | |
| 2004/0054926 A1 | 3/2004 | Ocepek et al. | |
| 2004/0107360 A1 | 6/2004 | Herrmann et al. | |
| 2005/0025125 A1 | 2/2005 | Kwan | |
| 2006/0020787 A1 | 1/2006 | Choyi et al. | |
| 2006/0031936 A1 | 2/2006 | Nelson et al. | |
| 2006/0036856 A1 | 2/2006 | Kok | |
| 2006/0277406 A1 | 12/2006 | Hashimoto et al. | |
| 2007/0079368 A1 | 4/2007 | Takeyoshi et al. | |
| 2007/0157308 A1 | 7/2007 | Bardsley et al. | |
| 2009/0313691 A1 | 12/2009 | Chien | |
| 2010/0146599 A1 | 6/2010 | Padmanabha et al. | |
| 2012/0023325 A1 | 1/2012 | Lai | |
| 2013/0074165 A1 * | 3/2013 | Dhaene | H04L 63/0272 726/5 |
| 2013/0074176 A1 | 3/2013 | Nishihata et al. | |
| 2014/0351447 A1 * | 11/2014 | Annamalaisami | H04L 69/14 709/227 |
| 2015/0033319 A1 | 1/2015 | Roberts et al. | |
| 2015/0215301 A1 | 7/2015 | Fischer et al. | |
| 2015/0281181 A1 * | 10/2015 | Albisu | H04L 63/18 726/7 |
| 2017/0208038 A1 | 7/2017 | Hinaman et al. | |
| 2018/0219885 A1 * | 8/2018 | Ahmadzadeh | H04W 12/1202 |

* cited by examiner

SYSTEM, METHOD AND COMPUTER-ACCESSIBLE MEDIUM FOR TWO-FACTOR AUTHENTICATION DURING VIRTUAL PRIVATE NETWORK SESSIONS

FIELD OF THE DISCLOSURE

The present disclosure relates generally to two-factor authentication, and more specifically, to exemplary embodiments of an exemplary system, method and computer-accessible medium for two-factor authentication during virtual private network sessions.

BACKGROUND INFORMATION

Prior to the advent of the personal computer, employees would travel to their office every day to perform their work functions. When personal computers came along, tasks became easier for employees to perform. However, based on the limitations of the personal computer, and the limitations of networking technology, workers were still required to travel to their office to perform their work functions. Various mobile devices were also introduced (e.g., Blackberry and Palm devices) that allowed workers to perform some functions remotely, mostly limited to communications (e.g., email, messaging, etc.). However, the remote capabilities of employees were still limited.

As personal computers advanced and proliferated into most people's homes (e.g., including affordable laptops), and with the increase in networking technologies and networking speed, employees could now perform many tasks at home that previously required them to be in their office to perform. In fact, with the advancement of remote software capabilities, which can facilitate an employee to perform most if not all of their tasks remotely, more and more work functions are being performed out of the office. However, this has presented a significant security risk, as many employees need to access work resources remotely, which can be more vulnerable to security breaches than a single secure network at an office.

In order to facilitate remote access, two-factor authentication has been developed, which can be used to ensure that the person accessing the work resources should be granted access. Two-factor authentication is an authentication method in which a user or employee is granted access only after successfully presenting two or more pieces of evidence (or factors) to an authentication mechanism. This can be something the employee knows and something the employee has. For example, typical two-factor authentication systems for remote access include an employee-specific password (which should be known only by the employee) and a device that is in the possession of the employee (e.g., a security-enabled key or a mobile device). When an employee enters their password to access certain resources (the first factor), they are then prompted to provide the second factor. This second factor can include approving a push notification on a mobile device or inserting a security-enabled device into a computer (e.g., inserted a flash drive device into a computer) that has a security key stored thereon. Once both factors have been authenticated, the employee can be granted access to the work resources. However, when accessing work resources at multiple times throughout a day, it can be cumbersome to keep having to authenticate using both factors.

Thus, it may be beneficial to provide an exemplary system, method and computer-accessible medium for two-factor authentication during network sessions which can overcome at least some of the deficiencies described herein above.

SUMMARY OF EXEMPLARY EMBODIMENTS

An exemplary system, method, and computer-accessible medium for authenticating a second device, can include initiating a first network connection between a server and a first device, initiating a second network connection between the server and the second device, and authenticating the second device based on the first network connection and the second network connection. Access to a network resource(s) can be granted to the second device based on the authentication. Access to the network resource(s) by the second device can be revoked if the first network connection is severed. The first network connection can be a first encrypted network connection and the second network connection can be a second encrypted network connection. The first network connection can be a first virtual private network ("VPN") connection and the second network connection can be a second VPN connection.

In some exemplary embodiments of the present disclosure, the second network connection can be initiated over the first network connection. The first device can be a gateway. The gateway can include (i) a mobile phone, (ii) a modem, (iii) a router, or (iv) a network access device. The second device can include (i) a mobile phone, (ii) a laptop, or (iii) a network connected device. A third network connection between the server and a third device can be initiated, and the third device can be authenticated based on the first network connection and the third network connection. The third network connection can be initiated over the first network connection.

Additionally, a system for multifactor authentication can include a server, a first device connected to the server over a first network connection, and a second device connected to the server over a second network connection, where the server is configured to authenticate the second device based on the first network connection and the second network connection. The server can be further configured to grant access to a network resource(s) to the second device based on the authentication. The server can be configured to revoke access to the network resource(s) by the second device if the first network connection is severed. The first network connection can be a first virtual private network ("VPN") connection and the second network connection can be a second VPN connection. The second network connection can be initiated over the first network connection. The first device can include (i) a mobile phone, (ii) a modem, (iii) a router, or (iv) a network access device. The second device can include (i) a mobile phone, (ii) a laptop, or (iii) a network connected device. A third device can be connected to the server over a third network connection, where the third network connection can be initiated over the first network connection, and the server can be configured to grant access to the network resource(s) based on the first network connection and the third network connection.

Additionally, an exemplary system, method, and computer-accessible medium for two factor authentication, can include initiating a first virtual private network (VPN) connection between a first network device and a server, initiating a network connection between a second network device and the first network device, initiating a second VPN connection between the second network device and the server over the first VPN connection, and granting access to resources on a network associated with the server based on the first VPN connection and the second VPN connection.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

The exemplary system, method and computer-accessible medium, according to an exemplary embodiment of the present disclosure, can utilize two network connections (e.g., virtual private network connections) to facilitate two-factor authentication. Once the two network connections are established, network or work resources can be granted. If at any point the two factors change (e.g., one or both of the connections is lost) then the access to the resource can be revoked. For example, when employing a mobile device, a virtual private network ("VPN") on the mobile device can be setup on a mobile device. This can be based on its own two-factor authentication, which can be employed when establishing the VPN. However, a separate two-factor authentication may or may not be needed for the mobile device when connecting to the VPN. Another device (e.g., a computer) can connect to the mobile device (e.g., as a hotspot) and receive a token from the mobile device, since the mobile device already had two factor authentication initiated. Then the computer can initiate another VPN connection through the mobile device to the network being accessed (e.g., to server on the network being accessed).

Once this two-factor authentication has been performed, the computer can be granted access to the network (e.g., resources on the network) by the server. If the mobile device (e.g., the hotspot device) is disconnected from the VPN, then the computer will no longer have VPN access to server, and the network access will be revoked. If the computer is disconnected from the mobile device, the network access will also be revoked as the mobile device is required for one of the factors in the two-factor authentication. However, if the computer is disconnected from the mobile device, the mobile device can still have VPN access (since it already went through its own two-factor authentication). Thus, the mobile device does not have to keep reauthenticating to maintain its own access to the network resources.

By employing the above procedure, the exemplary system, method and computer-accessible medium solves the problem of having to re-authenticate multiple times. This can be based on the initial two-factor authentication by the mobile device, which can be used as one factor in a separate two-factor authentication for a device connected to the mobile device. Once the mobile device is granted access using its own two-factor authentication, other devices connected to the mobile device can be granted access through their own secure connection over the mobile device.

Figure 1:
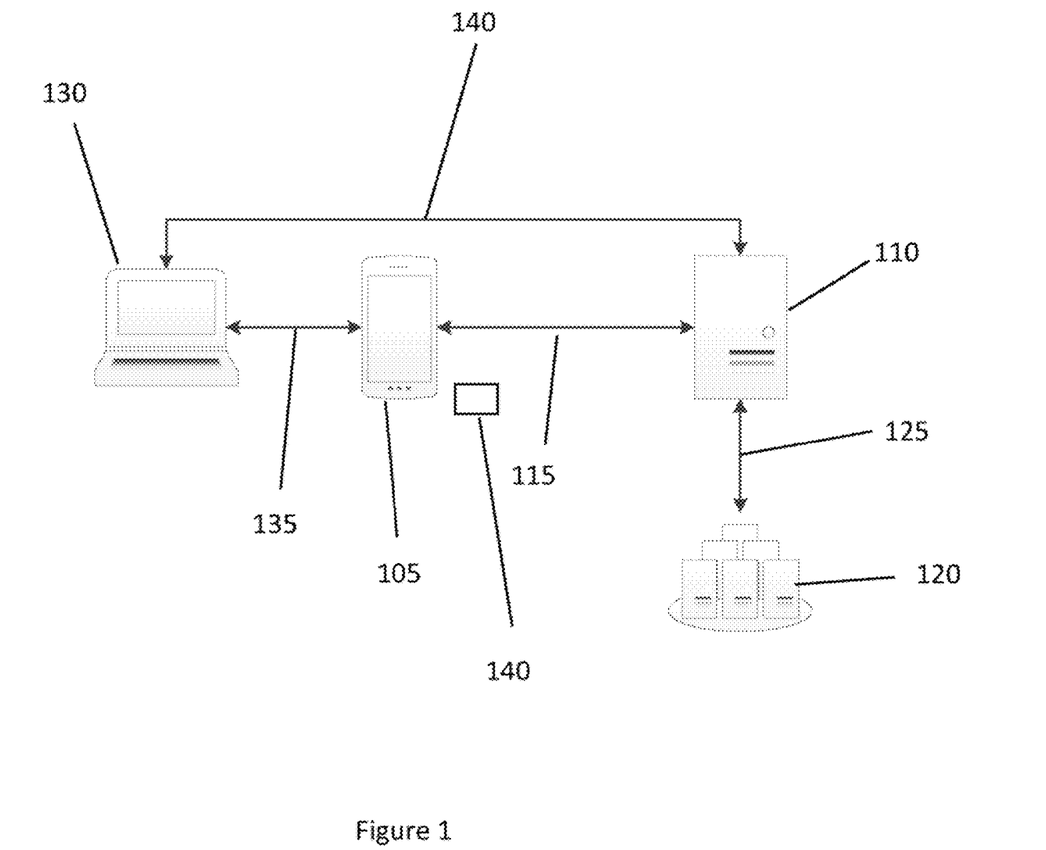
FIG. 1 is an exemplary schematic diagram of a two-factor system using multiple network connections formed over a mobile device and a computer according to an exemplary embodiment of the present disclosure.

FIG. 1 is an exemplary schematic diagram of a two-factor system using multiple network connections according to an exemplary embodiment of the present disclosure. For example, when an employee seeks to enable remote access, the employee can use mobile device 105. Mobile device 105 can be a mobile phone, tablet, or any other internet connected device. Additionally, while mobile device 105 is shown as being a mobile device, which can facilitate a network connection for computer 130, device 105 can be any other suitable device that can provide a network connection for computer 130 (e.g., a wired router, a Wi-Fi access point, etc.). Using mobile device 105, the employee can activate a remote connection to server 110 through network connection 115. Network connection 115 can be a standard, non-encrypted network connection, or an encrypted private network connection. For example, network connection 115 can be a VPN connection.

Mobile device 105 can authenticate network connection 115 using single or two factor authentication. If single factor authentication is used, then simply accessing the phone itself can facilitate enabling network connection 115. For example, once the employee accesses mobile device 105 (e.g., using a password, fingerprint, facial recognition, or other suitable digital locking mechanism), the employee can simply activate network connection 115, without any further authentication. Alternatively, once mobile device 105 is accessed, two-factor authentication can be used to enable network connection 115. For example, the employee can be prompted to enter in a network password. Alternatively, or in addition to entering a network password, an additional authentication can be used. For example, a push notification can be sent to mobile device 105, which has to be granted by the employee, or the push notification can be sent to another device owned or operated by the employee. Additionally, a near-field communication ("NFC") enabled device 140 (e.g., a flash drive, smart card, etc.) can be required to be in communication with mobile device 105, by being near mobile device 105.

Once mobile device 105 is authenticated by server 110, over network connection 115, server 110 can provide access to certain network resources 120 to mobile device 105. Network resources 120 can be connected to server 110 through network 125. Various suitable network resources can be provided including, but not limited to, electronic mail, instant messaging, file access, etc., which can normally be available to those employees located at the office (e.g., already within network 125).

In addition to providing network resource access to mobile device 105, network connection 115 can facilitate access to computer 130. For example, after network connection 115 is established, and mobile device 105 is authenticated, computer 130 can establish network connection 135 with mobile device 135. Once network connection 135 is established, computer 130 can establish a second network connection 140 directly with server 110 through network connections 135 and 115. This second network connection can also be a VPN connection, and can be initiated and authenticated in a manner similar to the establishment of the VPN connection between mobile device 105 and server 110. Once computer 130 is authenticated by server 110, computer 130 can be provided with access to network resources 120. As long as computer 130 maintains network connection 140, through network connections 135 and 115, then computer 130 will maintain access to network resources 120. However, if either network connection 135 or 115 is lost (e.g., disconnected), then computer 130's access to network resources 120 will be revoked, until the connection is again established.

Based on the above, employees can establish a much more secure connection when utilizing network resources 120. The employee will need access to mobile device 105, as well as computer 130 in order to be provided with access to network resources 120. If the employee loses access to mobile device 130, then they will no longer be able to access network resources 120.

The exemplary system, method and computer-accessible medium, according to an exemplary embodiment of the present disclosure, can also include token-based authentication in order to verify that mobile device 105 and/or computer 130, is an authorized user. This authentication can be in addition to the two-factor, VPN-based, authentication described above. For example, when mobile device 105 attempts to initiate a VPN connection to server 110, a token assigned to mobile device 105 can be used to determine if mobile device is allowed to access server 110 and resources 120. Token based authentication functions by ensuring that each request to a server is accompanied by a signed token which the server (e.g., server 110) verifies for authenticity and only then responds to the request (e.g., to accept the VPN connection request). For example, JSON Web Token ("JWT") is an open standard that defines a compact and self-contained method for securely transmitting information between parties encoded as a JSON object. JWT is compact in size which allows tokens to be easily transmitted via query strings, header attributes and within the body of a POST request. The access token can include the security credentials (e.g., the credentials of the user requesting VPN access) for the consumer.

The exemplary tokens can be signed to protect against manipulation. However, the tokens may or may not be encrypted. If the tokens are encrypted, then either private key/private key encryption can be employed between mobile device 105 and server 110, or public key/private key encryption can be employed.

In order to generate a token, the exemplary system, method, and computer-accessible medium can be provided with the credentials of the user. Credentials can be validated (e.g., based on the username and password provided by the user) and a signed token can be generated. The signed token can be sent along with other information (e.g., some other identifying information, including a location of mobile device 105) as a validation of such information. After receiving the token, the identity of mobile device 105 can be verified, and a VPN connection can be established between mobile device 105 and server 110. A similar procedure (e.g., token-based procedure) can be employed when computer 130 establishes a VPN connection with server 110.

As described above, mobile device 105 can access network resources 120 through network connection 115 (e.g., a VPN connection) and computer 130 can access network resources 120 through network connection 140 (e.g., a VPN connection). Alternatively, mobile device 105 may only be used as one factor in the two-factor authentication, and may not have access to network resources 120. Computer 130 would be provided access to network resources 120, but only by using its own VPN connection, which is connected through the VPN connection on mobile device 105. For example, mobile device 105 can establish a network connection 115 with server 110. However, server 110 may not provide mobile device 105 with access to network resources 120. Computer 130 can then establish network connection 140 with server 110. Server 110 can perform a check to determine that two network connections (e.g., two VPN connections) are established, one with mobile device 105 and one with computer 130. If two network connections are established (e.g., two-factor authentication), the computer 130 can be provided with access to network resources 120; however, mobile device 105 would not have access to network resources 120. Such an exemplary case provides for increased security when accessing network resources 120. In particular, each device (e.g., mobile device 105 and computer 130) on its own would not be granted access to network resources 120. Both devices would have to initiate separate secure connections with server 110 in order for computer 130 to gain access to network resources 120. If either of the network connections are broken, then computer 130 would no longer have access to network resources 120.

When the above-described two-factor authentication is initiated, computer 130 can be provided with access to network resources 120. If the two-factor connections is broken, the computer 130 can be denied access to network resources 120. Alternatively, different levels of resource access can be provided based on whether there is a two-factor connection or a single factor connection. For example, computer 130 can be provided with full access to network resources 120 if a two-factor authentication is established. However, if two-factor authentication is unavailable, then computer 130 can setup a single-factor VPN connections with server 110, and be provided with limited access to network resources 120. Limited access can be based on the nature of access (e.g., the sensitivity or security levels of the information normally accessible to computer 130 if a two-factor authentication is established).

Additionally, mobile device 105 can establish a single-factor authentication with server 110, and can be provided with partial access to network resources 120. If computer 130 establishes a two-factor authentication connection with server 110, then mobile device can be provided with full access to network resources 120. If, however, the VPN connection between computer 130 and server 110 is lost, then mobile device 105 can be denied full access to network resources 120. Thus, each device (e.g., mobile device 105 and computer 130) can separately establish a single-factor authentication connection with server 110 to be provided with limited access to network resources 120. However, once a two-factor authentication connection is established using both mobile device 105 and computer 130, then both mobile device 105 and computer 130 can be provided with full access to network resources 120.

Figure 2:
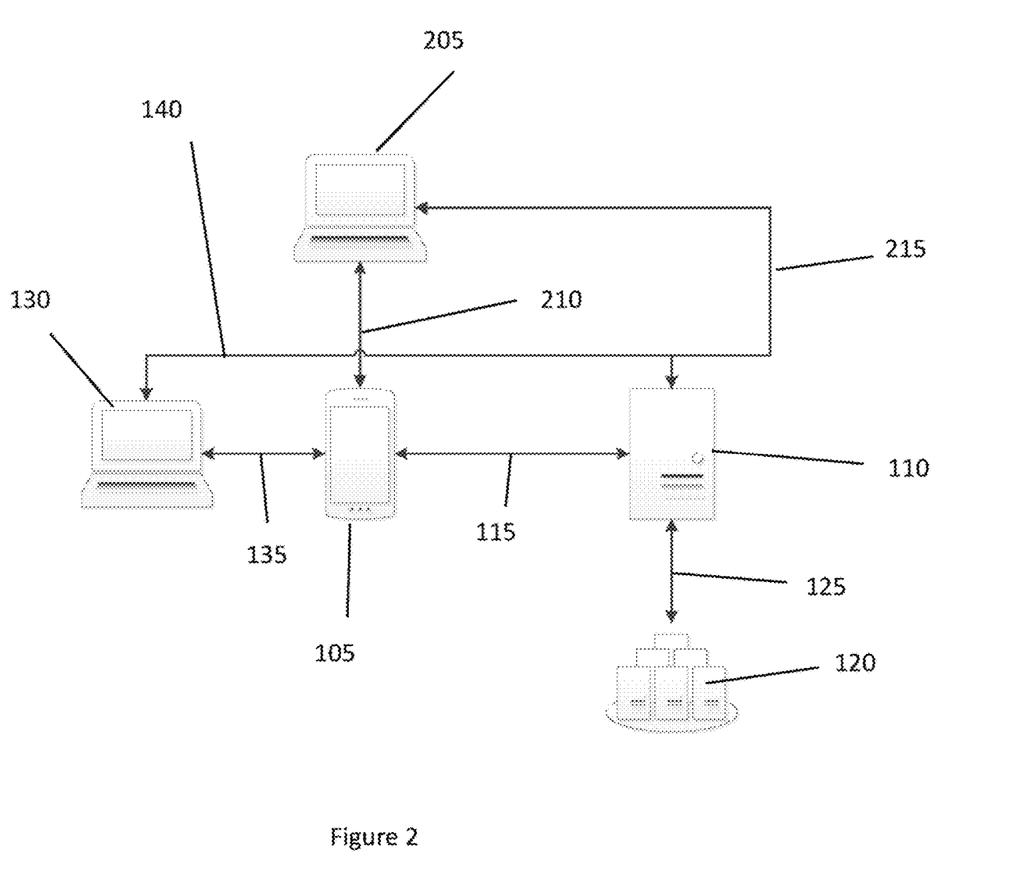
FIG. 2 is a further exemplary schematic diagram of a two-factor system using multiple network connections formed over a mobile device with multiple computers connected to the mobile device according to an exemplary embodiment of the present disclosure.

As shown in FIG. 2, once mobile device 105 has initiated a network connection 115 with server 110, computer 130 can be provided with a network connection 135 using mobile device 105, and can then initiate a second secure network connection 140 with server 110. Additionally, a second computer 205 can initiate a new network connection 210 with mobile device 105, which can provide network access to computer 205. Computer 205 can then initiate a secure network connection 215 with server 110 (e.g., forming its own two-factor authentication connection). Once the two-factor authentication is established, then computer 205 can be provided with access to network resources 120.

Figure 3:
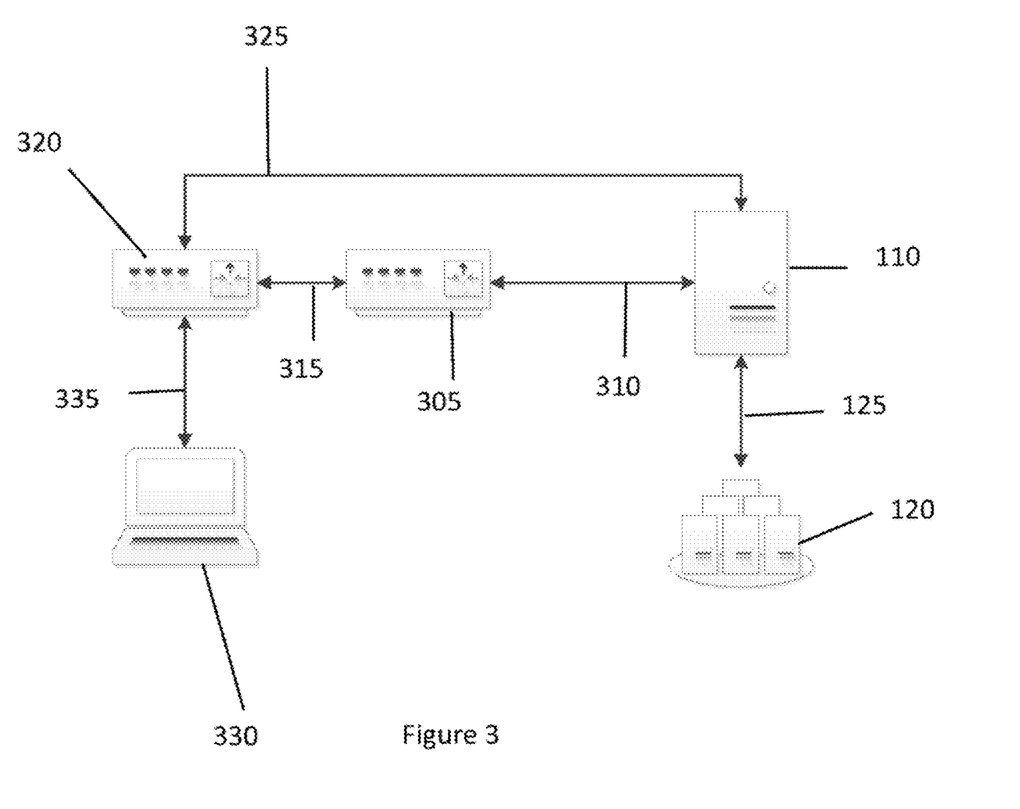
FIG. 3 is a further exemplary schematic diagram of a two-factor system using multiple network connections formed over multiple routers according to an exemplary embodiment of the present disclosure.

As described above device 130 can be a computer. Alternatively, as shown in FIG. 3, multiple devices (e.g., routers) can provide internet access. For example, a first router 305, or similar internet access device, can initiate a network connection 310 with server 110. Router 305 can then be provided with no access to network resources 120, limited access to network resources 120, or full access to network resources 120. A second router 320 can initiate a second network connection 315 with router 305, and then a separate secure network connection 325 with server 110 over network connection 315. This can establish a two-factor authenticated connection with server 110. Router 320 can then be provided with no access to network resources 120, limited access to network resources 120, or full access to network resources 120. After router 320 establishes a secure network connection with server 110, a computer 330 can initiate a network connection 335 with router 320, and be provided with access to network resources 120 using the two-factor-authenticated secure network connection formed by routers 305 and 320.

In order to secure the network connections described above, various suitable encryption procedures (e.g., Triple DES, RSA, AES, or two-fish) and encryption levels can be used. For example, mobile device 105 and computer 130 can use the same encryption procedure and/or the same encryption level. However, if mobile device is only used to provide one factor in the two-factor authentication, and is not granted access to any network resources 120, then a lower level of encryption can be used for mobile device 105, as there is no sensitive data being sent between mobile device 105 and server 110 and thus mobile device 105 does not need as secure of a connection. In this case, computer 130 can have a higher level of encryption since the sensitive information would be sent between computer 130 and server 110.

Figure 4:
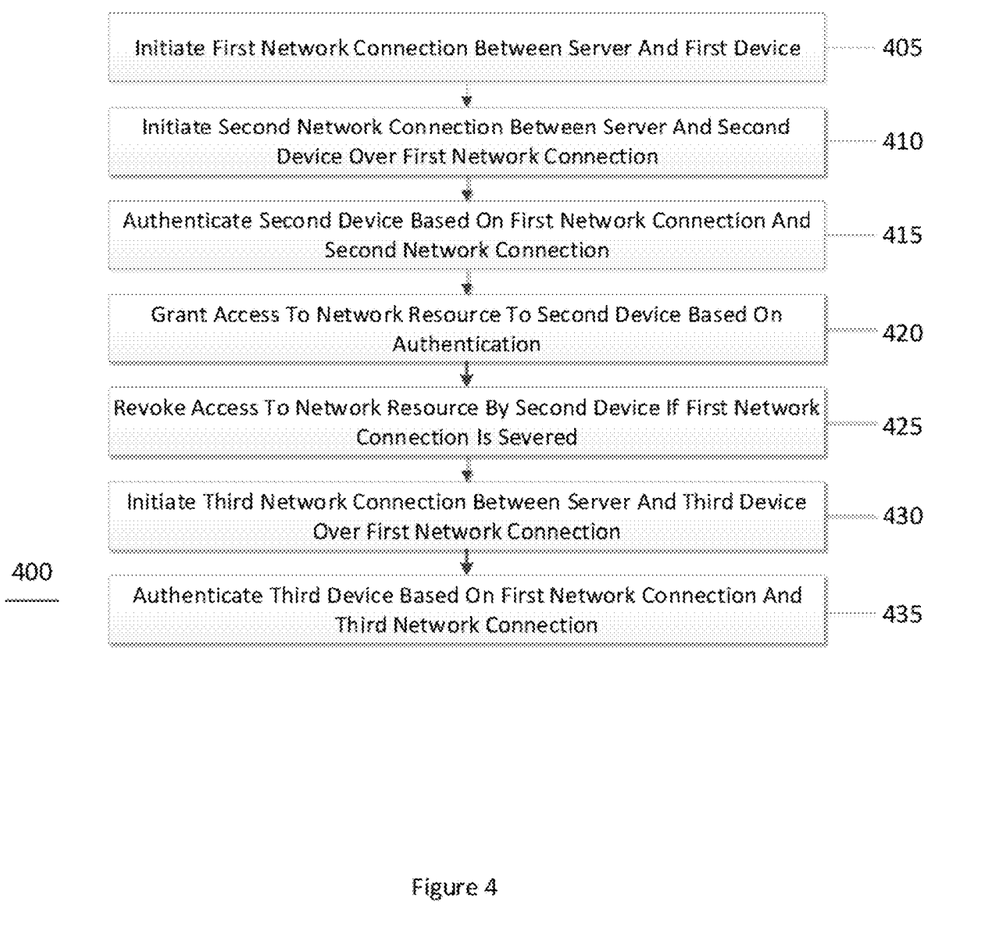
FIG. 4 is a flow diagram of a method for authenticating a second device according to an exemplary embodiment of the present disclosure.

FIG. 4 is a flow diagram of a method 400 for authenticating a second device according to an exemplary embodiment of the present disclosure. For example, at procedure 405, a first network connection can be initiated between a server and a first device. At procedure 410, a second network connection can be initiated between a server and a second device over the first network connection. At procedure 415, the second device can be authenticated based on the first network connection and the second network connection. At procedure 420, access to a network resource can be granted to the second device based on the authentication. At procedure 425, access to the network resource by second device can be revoked if the first network connection is severed. At procedure 430, a third network connection can be initiated between the server and a third device over the first network connection. At procedure 435, the third device can be authenticated based on the first network connection and the third network connection.

Figure 5:
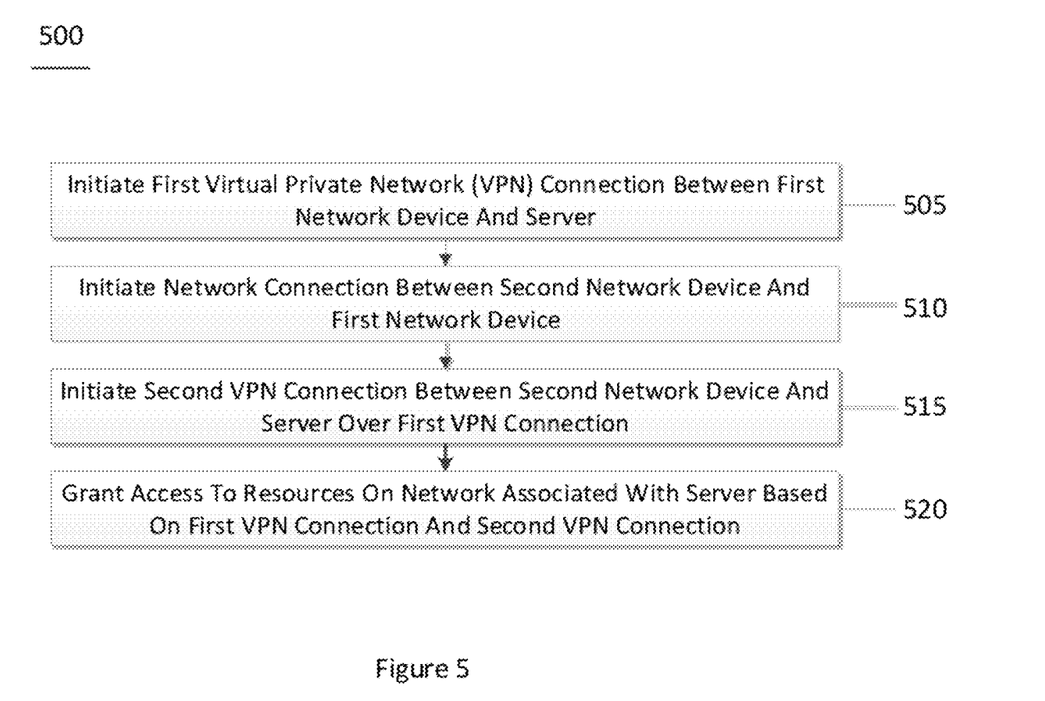
FIG. 5 is a flow diagram of a method for two factor authentication according to an exemplary embodiment of the present disclosure.
Figure 6:
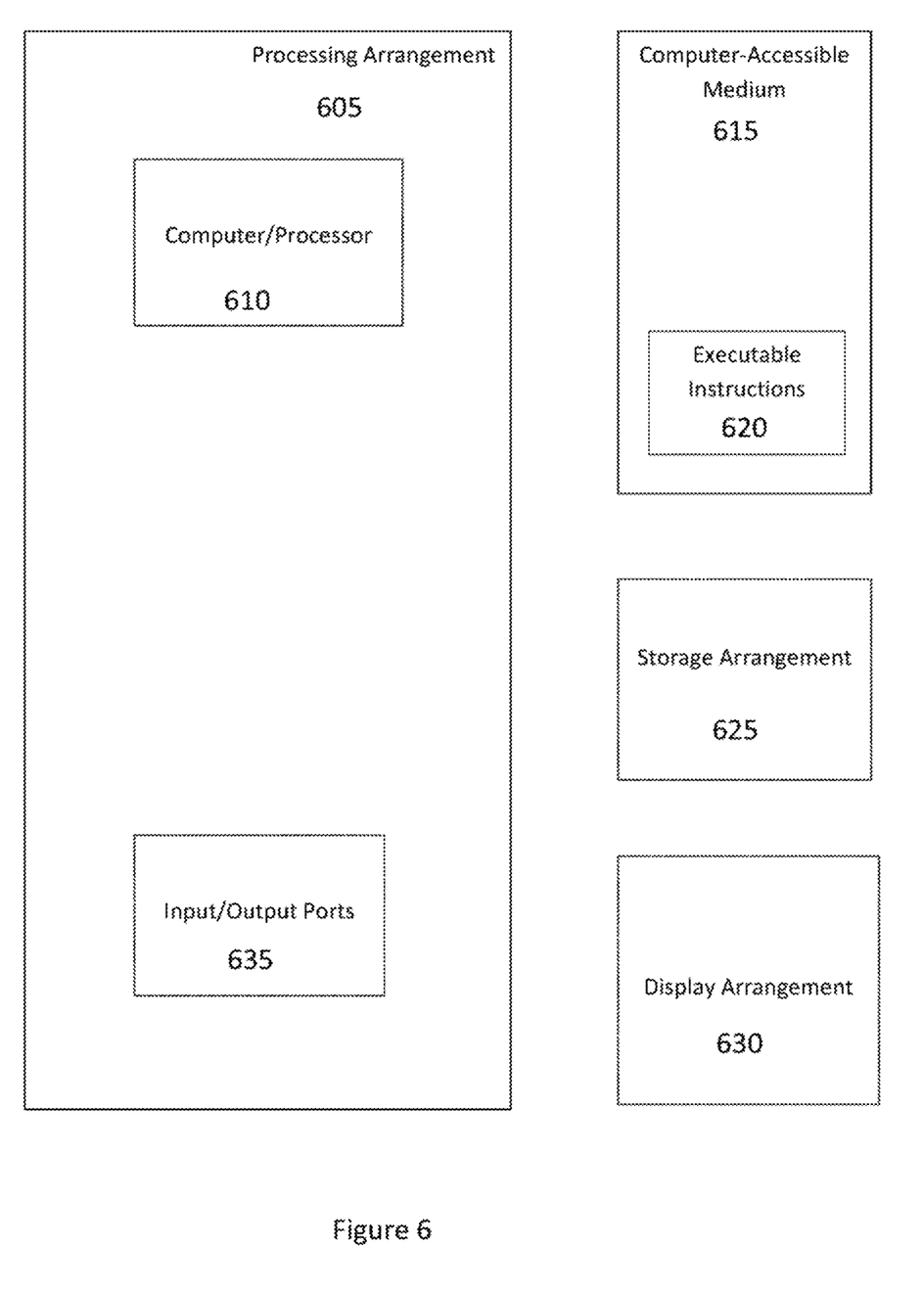
FIG. 6 is an illustration of an exemplary block diagram of an exemplary system in accordance with certain exemplary embodiments of the present disclosure.

FIG. 5 is a flow diagram of a method 500 for two factor authentication according to an exemplary embodiment of the present disclosure. For example, at procedure 505, a first virtual private network ("VPN") connection can be initiated between a first network device and a server. At procedure 510, a network connection can be initiated between a second network device and the first network device. At procedure 515, a second VPN connection can be initiated between the second network device and the server over the first VPN connection. At procedure 520, access to resources on a network associated with the server can be granted based on the first VPN connection and the second VPN connection FIG. 6 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 605. Such processing/computing arrangement 605 can be, for example entirely or a part of, or include, but not limited to, a computer/processor 610 that can include, for example one or more microprocessors, and use instructions stored on a computer-accessible medium (e.g., RAM, ROM, hard drive, or other storage device).

As shown in FIG. 6, for example a computer-accessible medium 615 (e.g., as described herein above, a storage device such as a hard disk, floppy disk, memory stick, CD-ROM, RAM, ROM, etc., or a collection thereof) can be provided (e.g., in communication with the processing arrangement 605). The computer-accessible medium 615 can contain executable instructions 620 thereon. In addition or alternatively, a storage arrangement 625 can be provided separately from the computer-accessible medium 615, which can provide the instructions to the processing arrangement 605 so as to configure the processing arrangement to execute certain exemplary procedures, processes, and methods, as described herein above, for example.

Further, the exemplary processing arrangement 605 can be provided with or include an input/output ports 635, which can include, for example a wired network, a wireless network, the internet, an intranet, a data collection probe, a sensor, etc. As shown in FIG. 6, the exemplary processing arrangement 605 can be in communication with an exemplary display arrangement 630, which, according to certain exemplary embodiments of the present disclosure, can be a touch-screen configured for inputting information to the processing arrangement in addition to outputting information from the processing arrangement, for example. Further, the exemplary display arrangement 630 and/or a storage arrangement 625 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for authenticating a second device, wherein, when a computer arrangement executes the instructions, the computer arrangement is configured to perform procedures comprising:
  initiating a first virtual private network (VPN) connection between a server and a first device;
  granting access to a first set of network resources to the first device based on the first VPN connection;
  initiating a second VPN connection between the server and the second device based on the first VPN connection;
  authenticating the second device based on the first VPN connection and the second VPN connection;
  granting access to a second set of network resources to the first device based on the first VPN connection and the second VPN connection;
  granting access to at least one third network resource to the second device based on the authentication of the second device; and
  revoking access to the at least one third network resource by the second device when the first VPN connection is severed.

2. The computer-accessible medium of claim 1, wherein the first VPN connection is a first encrypted network connection and the second VPN connection is a second encrypted network connection.

3. The computer-accessible medium of claim 1, wherein the computer arrangement is configured to revoke access to the second set of network resources by the first device if the second VPN connection is severed.

4. The computer-accessible medium of claim 1, wherein the computer arrangement is configured to initiate the second VPN connection over the first VPN connection.

5. The computer-accessible medium of claim 1, wherein the second set of network resources comprises the first set of network resources.

6. The computer-accessible medium of claim 1, wherein the first device includes one of (i) a mobile phone, (ii) a modem, (iii) a router, or (iv) a network access device.

7. The computer-accessible medium of claim 1, wherein the second device includes one of (i) a mobile phone, (ii) a laptop, or (iii) a network connected device.

8. The computer-accessible medium of claim 1, wherein the computer arrangement is further configured to:
  initiate a third VPN connection between the server and a third device; and
  authenticate the third device based on the first VPN connection and the third VPN connection.

9. The computer-accessible medium of claim 8, wherein the computer arrangement is configured to initiate the third VPN connection over the first VPN connection.

10. A system for multifactor authentication, comprising:
  a server;
  a first device connected to the server over a first virtual private network (VPN) connection; and
  a second device connected to the server over a second VPN connection based on the first VPN connection;
  wherein the server is configured to:
    grant access to a first set of network resources to the first device based on the first VPN connection;
    authenticate the second device based on the first VPN connection and the second VPN connection;
    grant access to a second set of network resources to the first device based on the first VPN connection and the second VPN connection;
    grant access to at least one third network resource to the second device based on the authentication of the second device; and
    revoke access to the at least one third network resource by the second device when the first VPN connection is severed.

11. The system of claim 10, wherein the server is further configured to revoke access to the second set of network resources by the first device if the second VPN connection is severed.

12. The system of claim 10, wherein the second VPN connection is initiated over the first VPN connection.

13. The system of claim 10, wherein the first device includes one of (i) a mobile phone, (ii) a modem, (iii) a router, or (iv) a network access device.

14. The system of claim 10, wherein the second device includes one of (i) a mobile phone, (ii) a laptop, or (iii) a network connected device.

15. The system of claim 10, further comprising a third device connected to the server over a third VPN connection, wherein the third VPN connection is initiated over the first VPN connection, and wherein the server is configured to grant access to a fourth set of network resources to the third device based on the first VPN connection and the third VPN connection.

16. A method for two factor authentication, comprising:
  initiating a first virtual private network (VPN) connection between a first network device and a server;
  granting by the server access to a first set of network resources on a network associated with the server to the first device based on the first VPN connection;
  initiating a network connection between a second network device and the first network device;
  initiating a second VPN connection between the second network device and the server over the first VPN connection;
  granting by the server access to a second set of network resources on the network associated with the server to the first device based on the first VPN connection and the second VPN connection;
  granting by the server access to a third set of network resources on the network associated with the server to the second network device based on the first VPN connection and the second VPN connection; and
  revoking by the server access to the third set of network resources on the network associated with the server by the second network device when the first VPN connection is severed.

17. The method of claim 16, further comprising:
  initiating a third VPN connection between the server and a third network device over the first VPN connection; and
  authenticating the third network device based on the first VPN connection and the third VPN connection.

18. The method of claim 17, further comprising:
  granting by the server access to a fourth set of network resources on the network associated with the server to the third network device based on the first VPN connection and the third VPN connection.

19. The method of claim 16, wherein the first network device is a gateway, the gateway including one of (i) a mobile phone, (ii) a modem, (iii) a router, or (iv) a network access device.

20. The method of claim 16, wherein the second network device includes one of (i) a mobile phone, (ii) a laptop, or (iii) a network connected device.

* * * * *